US007865770B2

(12) United States Patent
Quach (10) Patent No.: US 7,865,770 B2
(45) Date of Patent: Jan. 4, 2011

(54) PROCESSOR INCLUDING EFFICIENT SIGNATURE GENERATION FOR LOGIC ERROR PROTECTION

(75) Inventor: Nhon Quach, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 381 days.

(21) Appl. No.: 11/972,171

(22) Filed: Jan. 10, 2008

(65) Prior Publication Data

US 2009/0182991 A1 Jul. 16, 2009

(51) Int. Cl.
G06F 11/00 (2006.01)
(52) U.S. Cl. .......................................... 714/11; 714/45
(58) Field of Classification Search .................... 714/11, 714/45
See application file for complete search history.

(56) References Cited

U.S. PATENT DOCUMENTS

| | | | | |
|---|---|---|---|---|
| 5,586,278 | A * | 12/1996 | Papworth et al. | 712/235 |
| 5,915,110 | A * | 6/1999 | Witt et al. | 712/239 |
| 5,966,544 | A * | 10/1999 | Sager | 712/32 |
| 6,357,024 | B1 * | 3/2002 | Dutton et al. | 714/45 |
| 6,615,366 | B1 * | 9/2003 | Grochowski et al. | 714/10 |
| 6,625,749 | B1 | 9/2003 | Quach | |
| 6,640,313 | B1 | 10/2003 | Quach | |
| 6,772,368 | B2 * | 8/2004 | Dhong et al. | 714/11 |
| 6,981,176 | B2 * | 12/2005 | Fruehling et al. | 714/11 |
| 7,340,643 | B2 * | 3/2008 | Grochowski et al. | 714/11 |
| 7,461,312 | B2 * | 12/2008 | Tardif et al. | 714/732 |
| 2001/0049762 | A1 | 12/2001 | Ohwada | |
| 2002/0073357 | A1 | 6/2002 | Dhong | |
| 2004/0153763 | A1 * | 8/2004 | Grochowski et al. | 714/17 |
| 2004/0181726 | A1 | 9/2004 | Vorbach | |
| 2005/0138478 | A1 | 6/2005 | Safford | |

(Continued)

FOREIGN PATENT DOCUMENTS

DE 10349581 5/2005

(Continued)

OTHER PUBLICATIONS

Sundaramoorthy, et al., "Multipath Execution on Chip Multiprocessors Enabled by Redundant Threads", Technical Report CESR-TR-01-2, Center for Embedded System Research (CESR), Department of Electrical and Computer Engineering, North Carolina State University, Oct. 23, 2001, pp. 1-19.

(Continued)

Primary Examiner—Marc Duncan
(74) Attorney, Agent, or Firm—Meyertons, Hood, Kivlin, Kowert & Goetzel, P.C.; Stephen J. Curran (57) ABSTRACT

A processor core includes an instruction decode unit that may dispatch a same integer instruction stream to a plurality of integer execution units operating in lock-step. The processor core also includes signature generation logic that may generate, concurrently with execution of the integer instructions, a respective signature from result signals conveyed on respective result buses in one or more pipeline stages within each of the integer execution units in response to the result signals becoming available. The processor core also includes compare logic that may detect a mismatch between signatures from each of the integer execution units. Further, in response to the compare logic detecting any mismatch, the compare logic may cause instructions causing the mismatch to be re-executed.

18 Claims, 5 Drawing Sheets

U.S. PATENT DOCUMENTS

| | | |
|---|---|---|
| 2005/0204194 A1 | 9/2005 | Curry |
| 2005/0240793 A1 | 10/2005 | Safford |
| 2005/0268163 A1* | 12/2005 | Bancel et al. ............... 714/11 |
| 2009/0172359 A1 | 7/2009 | Shen |
| 2009/0182991 A1 | 7/2009 | Quach |
| 2009/0183035 A1 | 7/2009 | Butler |

OTHER PUBLICATIONS

U.S. Appl. No. 11/972,166, filed Jan. 10, 2008, Entitled "Processor Including Hybrid Redundancy for Logic Error Protection" by Butler, et al.

International Search Report in application PCT/US2009/000111 mailed May 11, 2009.

Sohi, et al; "A Study of Time-Redundant Fault Tolerance Techniques for High-Performance Pipelined Computers"; International Symposium on Fault Tolerant Computing (FTCS); Chicago, Jun. 1989.

Reinhardt, et al; "Transient Fault Detection Via Simulataneous Multithreading"; Computer Architecture News; ACM; New York, NY; vol. 28, No. 2, May 2000.

Mukherjee, et al; "Detailed Design and Evaluation of Redundant Multi-threading Alternatives"; Proceedings of the 29th International Symposium on Computer Architecture; ISCA; Anchorage, AL, May 2002.

\* cited by examiner

PROCESSOR INCLUDING EFFICIENT SIGNATURE GENERATION FOR LOGIC ERROR PROTECTION

BACKGROUND OF THE INVENTION

1. Field of the Invention

This invention relates to processors and, more particularly, to logic error protection within the processor.

2. Description of the Related Art

Electronic components may fail in a variety of ways. Components that include memory arrays may have bit failures that may manifest as data errors. Logic circuits may have stuck-at bits and/or delay errors. The list goes on. Many errors may be caused by manufacturing defects. For example, during manufacturing, particulate contamination can cause hard errors to appear both immediately and during later operation. Many of these errors may be classified as hard errors since once a failure is detected the failure is persistent. Although many hard errors may be detected during manufacturing test and burn-in, some may be more latent, or are just not caught. Some types of errors may be more damaging than others. For example, silent errors such as those that occur from corrupt memory data can be catastrophic, as there may be no way to recover unless the error is detected and either corrected or a recovery mechanism exists. Accordingly, many error detecting/correcting mechanisms were developed. More particularly, error detecting and error correcting codes (EDC/ECC) as well as EDC/ECC hardware has been built into designs. Traditionally, these techniques have been used in microprocessor designs to protect against memory errors. Since most logic errors in the past were caught during manufacturing test and burn-in, the logic has been left largely unprotected.

Soft errors, on the other hand, may be intermittent and appear random, and as such can be difficult to detect and correct. In the past, soft errors were typically isolated to systems that used cables and boards with connectors and the like. Now however, as manufacturing technologies advance and device sizes get smaller (e.g., <90 nm), another source of soft errors is emerging particularly in metal oxide semiconductor (MOS) devices. These new soft errors may be caused by neutron or alpha particle bombardment and may manifest as memory errors due to direct memory array bombardment, or logic errors as a result of logic element (e.g., flip-flop) bombardment.

In devices such as microprocessors, which contain millions of transistors, soft errors, if not detected, may cause catastrophic results. As a result, detection methods such as conventional chip level redundancy have been developed that may detect the errors at the chip boundary. For example, two identical processor chips in a system may execute the same code simultaneously and final results of each are compared at the chip boundary. In many conventional chip level redundancy schemes, the detection of such errors cannot be corrected and the system cannot recover transparently since the errors have already corrupted the processor internal execution states, thus requiring a reboot. Thus, although the error may be caught, this type of arrangement may not be acceptable in high reliability and high availability systems.

SUMMARY

Various embodiments of a processor including efficient signature generation for logic error protection are disclosed. In one embodiment, a processor core may operate in a normal execution mode and a reliable execution mode. The processor core includes an instruction decode unit that may be configured to dispatch a same integer instruction stream to a plurality of integer execution units when operating, for example, in the reliable execution mode. The plurality of integer execution units may be configured to operate in lock-step such that during each clock cycle, the plurality of integer execution units executes the same integer instruction, and should therefore have identical results. The processor core also includes signature generation logic that may generate a respective signature from result signals conveyed on respective result buses in one or more pipeline stages within each respective one of the plurality of integer execution units in response to the result signals becoming available. The signature generation unit may generate the signatures concurrently with execution of the integer instructions. The processor core also includes compare logic that is coupled to the signature generation logic and may be configured to detect a mismatch between signatures from each of the plurality of integer execution units. Further, in response to the compare logic detecting any mismatch, the compare logic may be configured to cause instructions causing the mismatch to be re-executed.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 1:
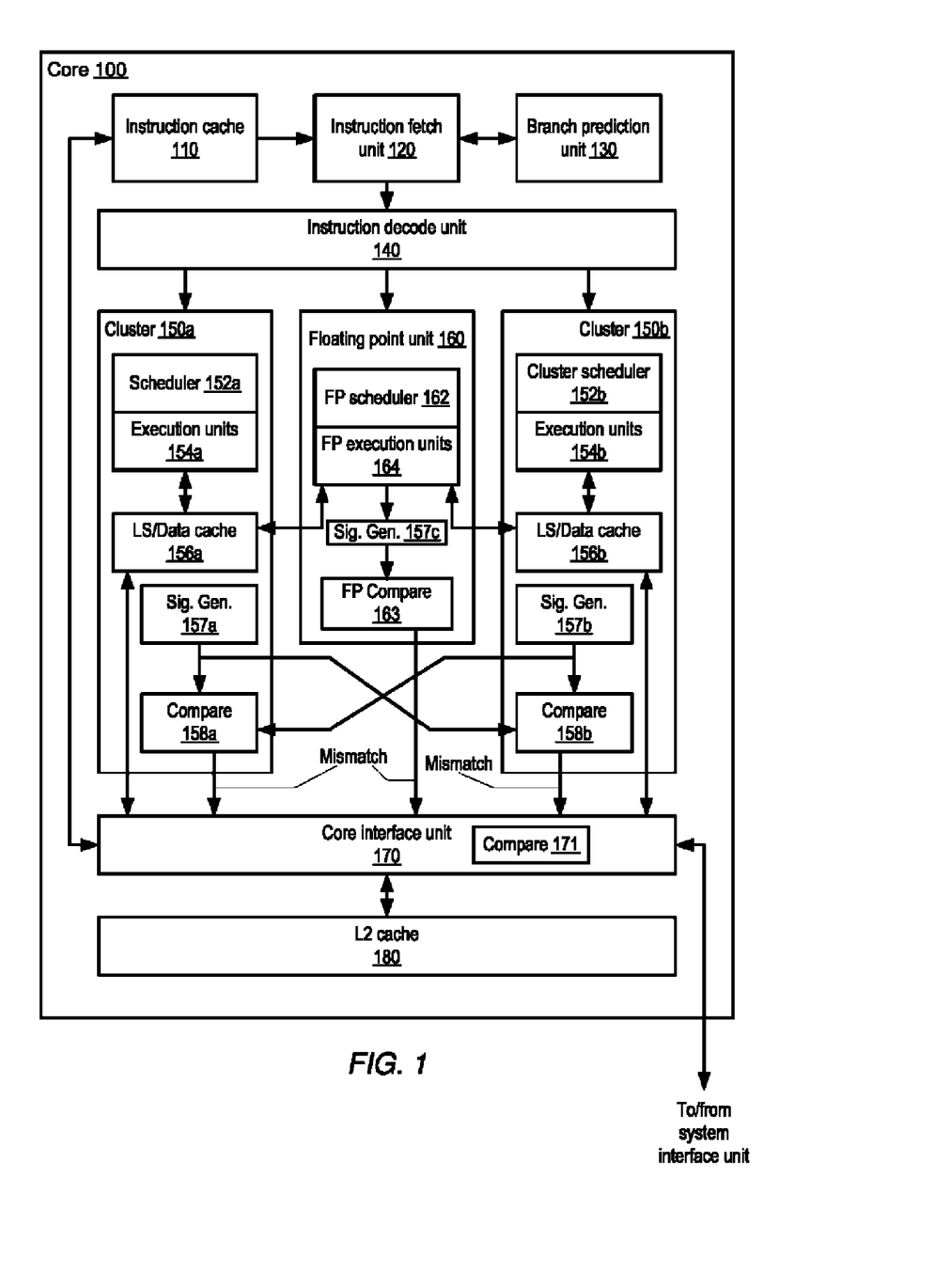
FIG. 1 is a block diagram of one embodiment of a processor core.

One embodiment of a processor core 100 is illustrated in FIG. 1. Generally speaking, core 100 may be configured to execute instructions that may be stored in a system memory (shown in FIG. 5) that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include an instruction cache (IC) 110 coupled to provide instructions to an instruction fetch unit (IFU) 120. IFU 120 may be coupled to a branch prediction unit (BPU) 130 and to an instruction decode unit 140. Decode unit 140 may be coupled to provide operations to a plurality of integer execution clusters 150*a-b* as well as to a floating point unit (FPU) 160. Each of clusters 150*a-b* may include a respective cluster scheduler 152*a-b* coupled to a respective plurality of integer execution units 154a-b. Clusters 150a-b may also include respective data caches 156a-b coupled to provide data to execution units 154a-b. In the illustrated embodiment, data caches 156a-b may also provide data to floating point execution units 164 of FPU 160, which may be coupled to receive operations from FP scheduler 162. Data caches 156a-b and instruction cache 110 may additionally be coupled to core interface unit 170, which may in turn be coupled to a unified L2 cache 180 as well as to a system interface unit (SIU) that is external to core 100 (shown in FIG. 2 and described below). It is noted that although FIG. 1 reflects certain instruction and data flow paths among various units, additional paths or directions for data or instruction flow not specifically shown in FIG. 1 may be provided.

As described in greater detail below, core 100 may be configured for multithreaded execution in which instructions from distinct threads of execution may concurrently execute. In one embodiment, each of clusters 150a-b may be dedicated to the execution of instructions corresponding to a respective one of two threads, while FPU 160 and the upstream instruction fetch and decode logic may be shared among threads. In other embodiments, it is contemplated that different numbers of threads may be supported for concurrent execution, and different numbers of clusters 150 and FPUs 160 may be provided.

Instruction cache 110 may be configured to store instructions prior to their being retrieved, decoded and issued for execution. In various embodiments, instruction cache 110 may be configured as any type of cache and any size, and be physically or virtually addressed, virtually addressed or a combination of the two (e.g., virtual index bits and physical tag bits) as desired. In some embodiments, instruction cache 110 may also include translation lookaside buffer (TLB) logic configured to cache virtual-to-physical translations for instruction fetch addresses, although TLB and translation logic may be included elsewhere within core 100.

Instruction fetch accesses to instruction cache 110 may be coordinated by IFU 120. For example, IFU 120 may track the current program counter status for various executing threads and may issue fetches to instruction cache 110 in order to retrieve additional instructions for execution. In the case of an instruction cache miss, either instruction cache 110 or IFU 120 may coordinate the retrieval of instruction data from L2 cache 180. In some embodiments, IFU 120 may also coordinate prefetching of instructions from other levels of the memory hierarchy in advance of their expected use in order to mitigate the effects of memory latency. For example, successful instruction prefetching may increase the likelihood of instructions being present in instruction cache 110 when they are needed, thus avoiding the latency effects of cache misses at possibly multiple levels of the memory hierarchy.

Various types of branches (e.g., conditional or unconditional jumps, call/return instructions, etc.) may alter the flow of execution of a particular thread. Branch prediction unit 130 may generally be configured to predict future fetch addresses for use by IFU 120. In some embodiments, BPU 130 may include a branch target buffer (BTB) (not shown) that may be configured to store a variety of information about possible branches in the instruction stream. In one embodiment, the execution pipelines of IFU 120 and BPU 130 may be decoupled such that branch prediction may be allowed to "run ahead" of instruction fetch, allowing multiple future fetch addresses to be predicted and queued until IFU 120 is ready to service them. It is contemplated that during multi-threaded operation, the prediction and fetch pipelines may be configured to concurrently operate on different threads.

As a result of fetching, IFU 120 may be configured to produce sequences of instruction bytes, which may also be referred to as fetch packets. For example, a fetch packet may be 32 bytes in length, or another suitable value. In some embodiments, particularly for ISAs that implement variable-length instructions, there may exist variable numbers of valid instructions aligned on arbitrary boundaries within a given fetch packet, and in some instances instructions may span different fetch packets. Generally speaking decode unit 140 may be configured to identify instruction boundaries within fetch packets, to decode or otherwise transform instructions into operations suitable for execution by clusters 150 or FPU 160, and to dispatch such operations for execution.

In one embodiment, DEC 140 may be configured to first determine the length of possible instructions within a given window of bytes drawn from one or more fetch packets. For example, for an x86-compatible ISA, DEC 140 may be configured to identify valid sequences of prefix, opcode, "mod/rm" and "SIB" bytes, beginning at each byte position within the given fetch packet. Pick logic within DEC 140 may then be configured to identify, in one embodiment, the boundaries of up to four valid instructions within the window. In one embodiment, multiple fetch packets and multiple groups of instruction pointers identifying instruction boundaries may be queued within DEC 140, allowing the decoding process to be decoupled from fetching such that IFU 120 may on occasion "fetch ahead" of decode.

Instructions may then be steered from fetch packet storage into one of several instruction decoders within DEC 140. In one embodiment, DEC 140 may be configured to dispatch up to four instructions per cycle for execution, and may correspondingly provide four independent instruction decoders, although other configurations are possible and contemplated. In embodiments where core 100 supports microcoded instructions, each instruction decoder may be configured to determine whether a given instruction is microcoded or not, and if so may invoke the operation of a microcode engine to convert the instruction into a sequence of operations. Otherwise, the instruction decoder may convert the instruction into one operation (or possibly several operations, in some embodiments) suitable for execution by clusters 150 or FPU 160. The resulting operations may also be referred to as micro-operations, micro-ops, or uops, and may be stored within one or more queues to await dispatch for execution. In some embodiments, microcode operations and non-microcode (or "fastpath") operations may be stored in separate queues.

Dispatch logic within DEC 140 may be configured to examine the state of queued operations awaiting dispatch in conjunction with the state of execution resources and dispatch rules in order to attempt to assemble dispatch parcels. For example, DEC 140 may take into account the availability of operations queued for dispatch, the number of operations queued and awaiting execution within clusters 150 and/or FPU 160, and any resource constraints that may apply to the operations to be dispatched. In one embodiment, DEC 140 may be configured to dispatch a parcel of up to four operations to one of clusters 150 or FPU 160 during a given execution cycle.

In one embodiment, DEC 140 may be configured to decode and dispatch operations for only one thread during a given execution cycle. However, it is noted that IFU 120 and DEC 140 need not operate on the same thread concurrently. Various types of thread-switching policies are contemplated for use during instruction fetch and decode. For example, IFU 120 and DEC 140 may be configured to select a different thread for processing every N cycles (where N may be as few as 1) in a round-robin fashion. Alternatively, thread switching may be influenced by dynamic conditions such as queue occupancy. For example, if the depth of queued decoded operations for a particular thread within DEC 140 or queued dispatched operations for a particular cluster 150 falls below a threshold value, decode processing may switch to that thread until queued operations for a different thread run short. In some embodiments, core 100 may support multiple different thread-switching policies, any one of which may be selected via software or during manufacturing (e.g., as a fabrication mask option).

Generally speaking, clusters 150 may be configured to implement integer arithmetic and logic operations as well as to perform load/store operations. In one embodiment, each of clusters 150*a-b* may be dedicated to the execution of operations for a respective thread, such that when core 100 is configured to operate in a single-threaded mode, operations may be dispatched to only one of clusters 150. Each cluster 150 may include its own scheduler 152, which may be configured to manage the issuance for execution of operations previously dispatched to the cluster. Each cluster 150 may further include its own copy of the integer physical register file as well as its own completion logic (e.g., a reorder buffer or other structure for managing operation completion and retirement).

As described in greater detail below, in addition to the operation described above, in one embodiment processor core 100 may be configured to operate in a reliable execution mode. In one implementation, processor core 100 may selectably configured by to run either in a normal execution mode or the reliable execution mode by tying an external pin (shown in FIG. 5) to a predetermined reference voltage such as VDD or GND, for example. When the reliable execution mode is selected, dispatch logic within DEC 140 may be configured to dispatch the same sequence of instructions to the each of clusters 150*a-b* in the same clock cycle. In addition, clusters 150*a-b* may be configured to run in lock-step such that for each clock cycle the same instruction is in the same stage of the pipeline, and each cluster should produce identical results during each stage. Additionally, when operating in lock-step, all processor states should be identical between clusters 150*a-b*, and accesses to L2 cache 180 should happen substantially simultaneously. As described further below, these properties may be used to protect against the propagation of soft logic errors.

Within each cluster 150, execution units 154 may support the concurrent execution of various different types of operations. For example, in one embodiment execution units 154 may support two concurrent load/store address generation (AGU) operations and two concurrent arithmetic/logic (ALU) operations, for a total of four concurrent integer operations per cluster. Execution units 154 may support additional operations such as integer multiply and divide, although in various embodiments, clusters 150 may implement scheduling restrictions on the throughput and concurrency of such additional operations with other ALU/AGU operations. Additionally, each cluster 150 may have its own data cache 156 that, like instruction cache 110, may be implemented using any of a variety of cache organizations. It is noted that data caches 156 may be organized differently from instruction cache 110.

In the illustrated embodiment, unlike clusters 150, FPU 160 may be configured to execute floating-point operations from different threads, and in some instances may do so concurrently. FPU 160 may include FP scheduler 162 that, like cluster schedulers 152, may be configured to receive, queue and issue operations for execution within FP execution units 164. FPU 160 may also include a floating-point physical register file configured to manage floating-point operands. FP execution units 164 may be configured to implement various types of floating point operations, such as add, multiply, divide, and multiply-accumulate, as well as other floating-point, multimedia or other operations that may be defined by the ISA. In various embodiments, FPU 160 may support the concurrent execution of certain different types of floating-point operations, and may also support different degrees of precision (e.g., 64-bit operands, 128-bit operands, etc.). As shown, FPU 160 may not include a data cache but may instead be configured to access the data caches 156 included within clusters 150. In some embodiments, FPU 160 may be configured to execute floating-point load and store instructions, while in other embodiments, clusters 150 may execute these instructions on behalf of FPU 160.

As described above, if reliable execution mode is selected, dispatch logic within DEC 140 may be configured to consecutively dispatch the same thread to the FPU 160 each time a thread is executed by FPU 160. Thus as described further below, the results of each consecutive same thread execution may be compared for accuracy.

Instruction cache 110 and data caches 156 may be configured to access L2 cache 180 via core interface unit 170. In one embodiment, CIU 170 may provide a general interface between core 100 and other cores 100 within a system, as well as to external system memory, peripherals, etc. L2 cache 180, in one embodiment, may be configured as a unified cache using any suitable cache organization. Typically, L2 cache 180 will be substantially larger in capacity than the first-level instruction and data caches.

In some embodiments, core 100 may support out of order execution of operations, including load and store operations. That is, the order of execution of operations within clusters 150 and FPU 160 may differ from the original program order of the instructions to which the operations correspond. Such relaxed execution ordering may facilitate more efficient scheduling of execution resources, which may improve overall execution performance.

Additionally, core 100 may implement a variety of control and data speculation techniques. As described above, core 100 may implement various branch prediction and speculative prefetch techniques in order to attempt to predict the direction in which the flow of execution control of a thread will proceed. Such control speculation techniques may generally attempt to provide a consistent flow of instructions before it is known with certainty whether the instructions will be usable, or whether a misspeculation has occurred (e.g., due to a branch misprediction). If control misspeculation occurs, core 100 may be configured to discard operations and data along the misspeculated path and to redirect execution control to the correct path. For example, in one embodiment clusters 150 may be configured to execute conditional branch instructions and determine whether the branch outcome agrees with the predicted outcome. If not, clusters 150 may be configured to redirect IFU 120 to begin fetching along the correct path.

Separately, core 100 may implement various data speculation techniques that attempt to provide a data value for use in further execution before it is known whether the value is correct. For example, in a set-associative cache, data may be available from multiple ways of the cache before it is known which of the ways, if any, actually hit in the cache. In one embodiment, core 100 may be configured to perform way prediction as a form of data speculation in instruction cache 110, data caches 156 and/or L2 cache 180, in order to attempt to provide cache results before way hit/miss status is known. If incorrect data speculation occurs, operations that depend on misspeculated data may be "replayed" or reissued to execute again. For example, a load operation for which an incorrect way was predicted may be replayed. When executed again, the load operation may either be speculated again based on the results of the earlier misspeculation (e.g., speculated using the correct way, as determined previously) or may be executed without data speculation (e.g., allowed to proceed until way hit/miss checking is complete before producing a result), depending on the embodiment. In various embodiments, core 100 may implement numerous other types of data speculation, such as address prediction, load/store dependency detection based on addresses or address operand patterns, speculative store-to-load result forwarding, data coherence speculation, or other suitable techniques or combinations thereof.

Figure 5:
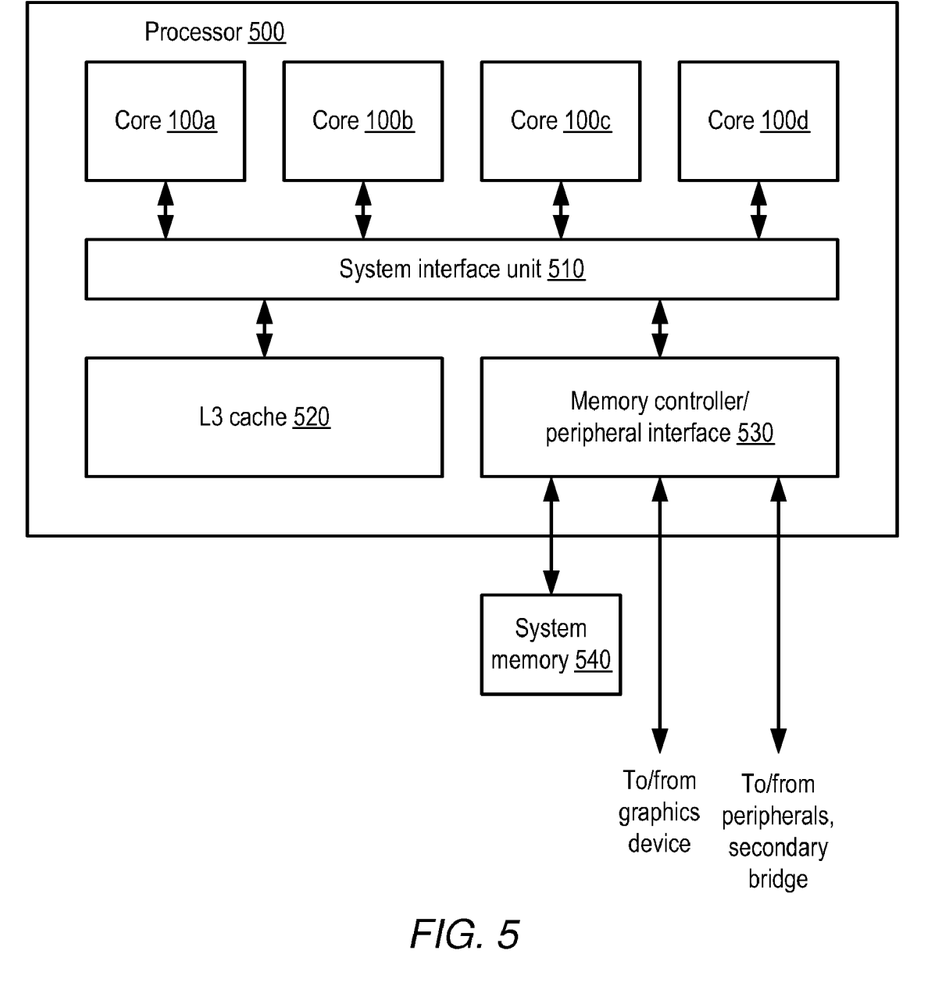
FIG. 5 is a block diagram of one embodiment of a processor including a plurality of the processor cores shown in FIG. 1.

In various embodiments, a processor implementation may include multiple instances of core 100 fabricated as part of a single integrated circuit along with other structures. One such embodiment of a processor is illustrated in FIG. 5.

As described briefly above, processor core 100 may be operated in a reliable execution mode. During which, the logic within each of clusters 150a-b is configured to operate in lock step, each cluster executing the same instruction stream. If there are no errors, results as placed on the result buses within the logic, should be identical during every clock cycle, at every stage. Thus an error caused, for example, by alpha particle bombardment to a logic element in one cluster should cause the results appearing on the result bus at some location after the affected logic element during a given clock cycle should be different when compared to the results appearing on the corresponding result bus in the other cluster during the same clock cycle.

As shown in FIG. 1, each cluster 150 includes a respective signature generator unit 157 and a respective compare unit 158. During operation, in one embodiment as results from various pipeline stages are generated on the result buses, signature generation units 157a and 157b may be configured to generate a signature from the respective result bus signals. In addition, datapath input signals and processor state information may be used to generate the signatures. Compare units 158a and 158b may be configured to compare the signatures presented for comparison, and to notify the CIU 170 in the event of a mismatch. CIU 170 may be configured to cause the affected instructions in both clusters to be flushed from the execution pipelines of both clusters 150 and re-executed. In one embodiment, CIU 170 may cause a machine check fault in response to a mismatch notification.

In various embodiments, any type of signature or compression may be used to generate the signature of the results. Using a signature or compression technique to create a signature or hash of the results may reduce the number of wires that must be routed to the compare units in each cluster and in the FPU 160. As long as the signature that is created has a high probability of representing the original signals, the signature is adequate. However although not as efficient, it is contemplated that in one embodiment, there may not be any compression and all result signals may be compared.

In addition, as mentioned above, execution logic in both clusters 150 should access the L2 Cache 180 at substantially the same time. Thus, compare unit 171 within CIU 170 may be configured to check when L2 accesses occur, and if they do not occur substantially simultaneously, CIU 170 may, as above, cause the affected instructions in both clusters to be flushed and re-executed.

In a similar way, if a branch mispredict occurs in one cluster, it should also occur in the other cluster. Thus, compare unit 171 within CIU 170 may also be configured to check for mispredict states between the two clusters.

As mentioned above, the FPU 160, which is a shared resource, may execute the same thread two times consecutively on the same logic. In one embodiment, similar to the a signature generators described above, signature generator 157c may be configured to generate a signature from the result of each thread execution. A compare unit within FPU 160 and designated FP compare 163, may be configured to compare the execution results of each thread prior to the results being allowed to leave FPU 160 and stored in the retirement queue, and if a mismatch is detected, to notify CIU 170 of the mismatch. As above, CIU 170 may cause the results to be flushed and the thread to be re-executed twice again.

Figure 2:
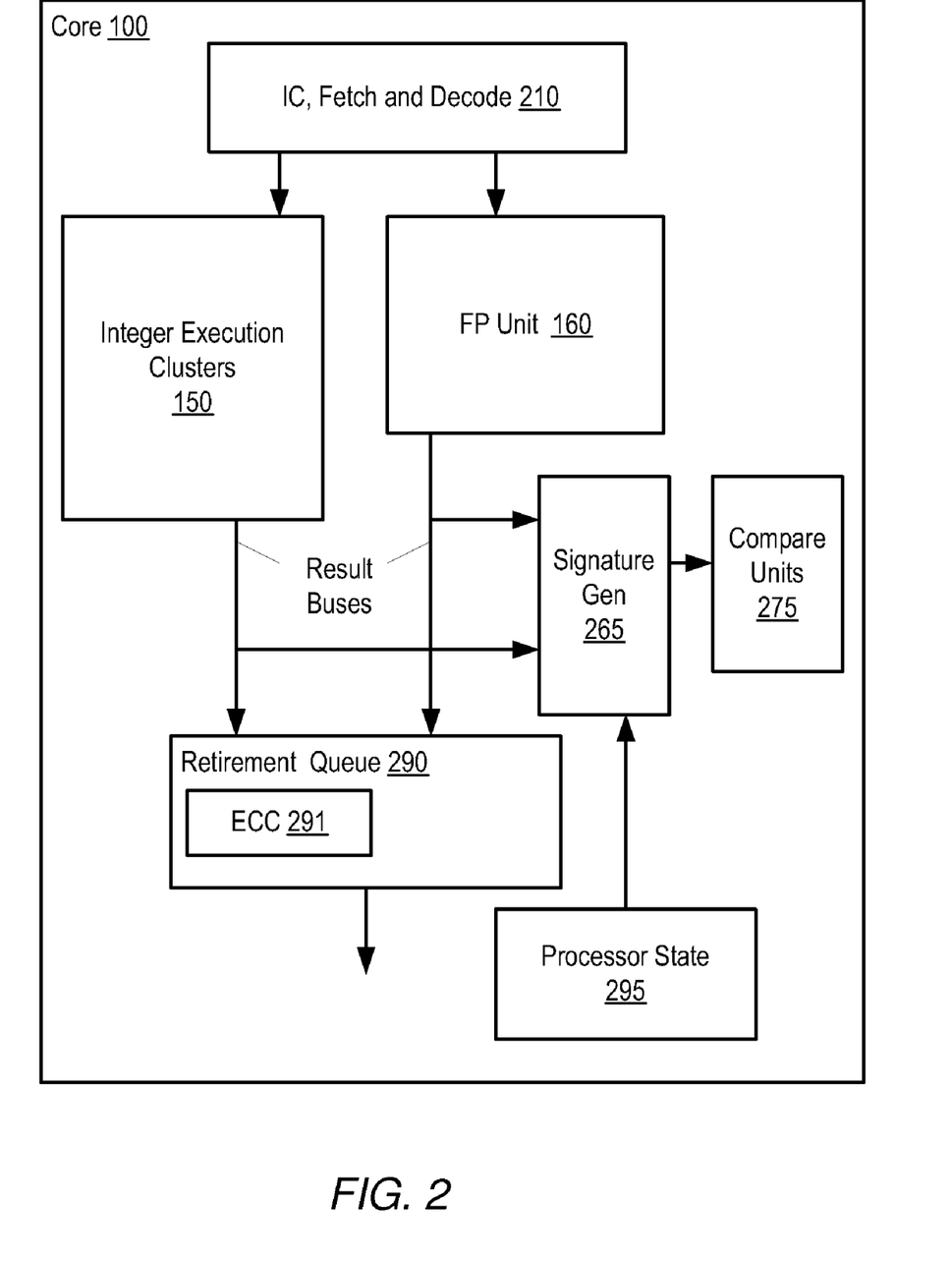
FIG. 2 is an architectural block diagram of one embodiment of the processor core logic error protection.

Thus, the above logic error protection may be referred to as cluster level space redundancy in the clusters 150 and thread level time redundancy in the FPU 170. As shown in FIG. 2, the signature generation and result comparisons occur in parallel with the execution of the instructions and prior to the instructions being stored in the retirement queue (shown in FIG. 2). Accordingly, errors may be detected before the instructions are retired, which may enable transparent error recovery. In addition, since the comparisons are made in parallel with the execution of the instructions, they not in the critical path. In conventional chip level redundancy schemes, the results that are checked are taken from the retirement queue and are thus in the critical path. In addition, EDC/ECC logic and code may be used to protect remaining memory, registers, and other system logic as desired. Thus, the combination of space, time, and EDC/ECC error protection redundancy creates a hybrid redundancy apparatus for protecting against logic errors.

Referring to FIG. 2, an architectural block diagram of one embodiment of the processor core logic error protection is shown. Components that correspond to components shown in FIG. 1 are numbered identically for simplicity. Various components have been omitted from FIG. 2 for clarity. Processor core 100 includes an instruction cache, and instruction fetch and decode logic, which is shown together and designated in FIG. 2 as reference number 210. In addition, coupled to the decode unit 210, processor core 100 as in FIG. 1, includes integer execution clusters 150, and a floating point unit, designated FP unit 160. Processor core 100 also includes a retirement queue 290 that is coupled to clusters 150 and to FP unit 160 via respective result buses. The result buses are also coupled to a signature generator 265, which in turn coupled to compare units 275. The signature generator 265 is also coupled to receive processor state information 295.

In the illustrated embodiment, the signature generator 265 is shown as a single unit. However, it is noted that the signature generator 265 may represent a distributed function, in which there may be multiple signature generation blocks, as shown in FIG. 1 and describe above.

In the illustrated embodiment, signature generator 265 is configured to generate a signature or hash of the results as they appear on the various result buses and before they are store in the retirement queue 290. Thus as mentioned above, the error checking is done out of the critical path.

In addition, in one embodiment, processor state information including, for example, EFLAGS register value, register file parity error state, external interrupts, and so on, may be included in each generated signature. The signatures may be sent to compare units 275 for comparison as described above in the description of FIG. 1. By checking the processor state information, latent problems that may be associated with the states of the processor, and that may not show up in the results, may be detected.

In the illustrated embodiment, retirement queue 290 is protected by ECC logic 291. Thus, once the checked results are stored in the retirement queue 290, they are protected from soft errors by parity or some other type of error detecting/correcting code.

Figure 3:
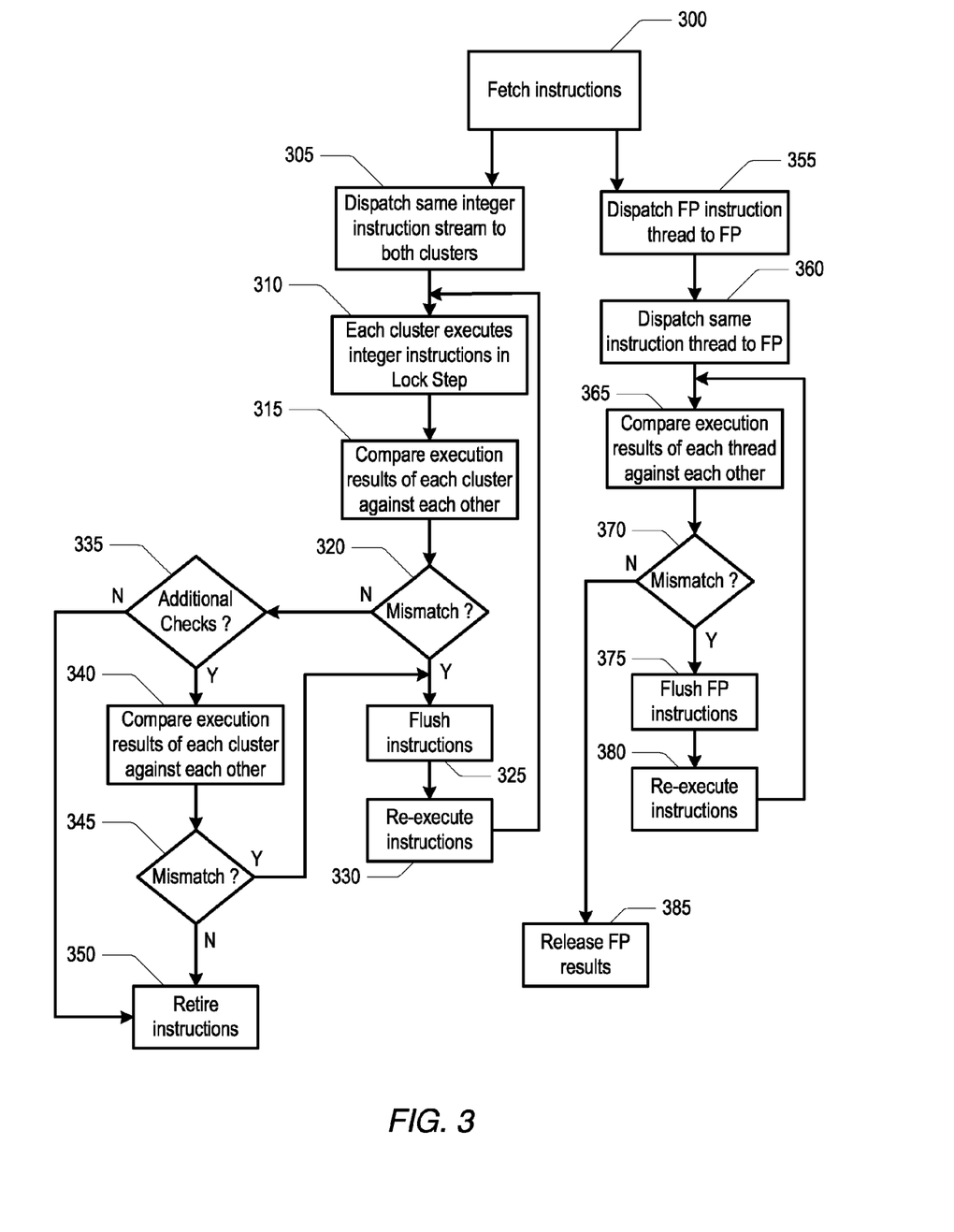
FIG. 3 is a flow diagram describing the operation of an embodiment of the processor of FIG. 1 and FIG. 2.

In FIG. 3, a flow diagram describing the operation of an embodiment of the processor core 100 of FIG. 1 and FIG. 2 is shown. Referring collectively to FIG. 1 through FIG. 3, and beginning in block 300 of FIG. 3, processor core 100 is operating in reliable execution mode, and fetches instructions. As described above, the DEC 140 dispatches the same integer instructions to cluster 150a and 150b substantially simultaneously (block 305). In reliable execution mode, the clusters 150 are configured to operate in lock-step (block 310). As the results of various pipeline stages become available, in each cluster, signals corresponding to those results are compared against each other. More particularly, each cluster may compare the signals corresponding to the local results at a given stage against signals corresponding to results from the other cluster at that stage. Since the clusters 150 are running in lock-step, the results should be identical. As described above, prior to comparing the signals, the result signals may be compressed in some way into a signature or hash. If either compare unit 158 detects a mismatch (block 320), the compare unit 158 may notify the CIU 170 which may raise a machine check fault, or another type of fault, causing the instructions to be flushed from both clusters (block 325), and re-executed (block 330). Operation continues as described above in conjunction with the description of block 305

Referring back to block 320, if there is no mismatch detected, the results may be written to the retirement queue 290 (block 350). It is noted that in other embodiments, additional results from additional stages may be checked. In such embodiments the signals corresponding to the results may be checked at each stage for a mismatch and if a mismatch is found, the instructions may be flushed and re-executed. However, if no mismatch is detected, the results may be written or stored in the retirement queue 290.

Referring back to block 300, if the fetched instructions are floating-point instructions, the DEC 140 may dispatch a floating-point instruction thread to the FPU 160 (block 355). The results (or signals corresponding to the results) of the thread execution are kept within, for example, FP compare unit 163 (block 360). In addition, when operating in the reliable execution mode, the DEC 140 dispatches the same floating-point instruction thread that was just executed to the FPU 160 (block 365). FP compare unit 163 compares the current results of the thread execution against the results from the previous thread execution (block 370).

If there is no mismatch (block 375), the results are released from the FPU 160, and stored in the retirement queue 290. However, if FP compare unit detects a mismatch (block 375), the floating-point instructions in the thread are flushed (block 380), and re-executed again, twice (block 385). Operation continues as described above in conjunction with the description of block 355.

Figure 4:
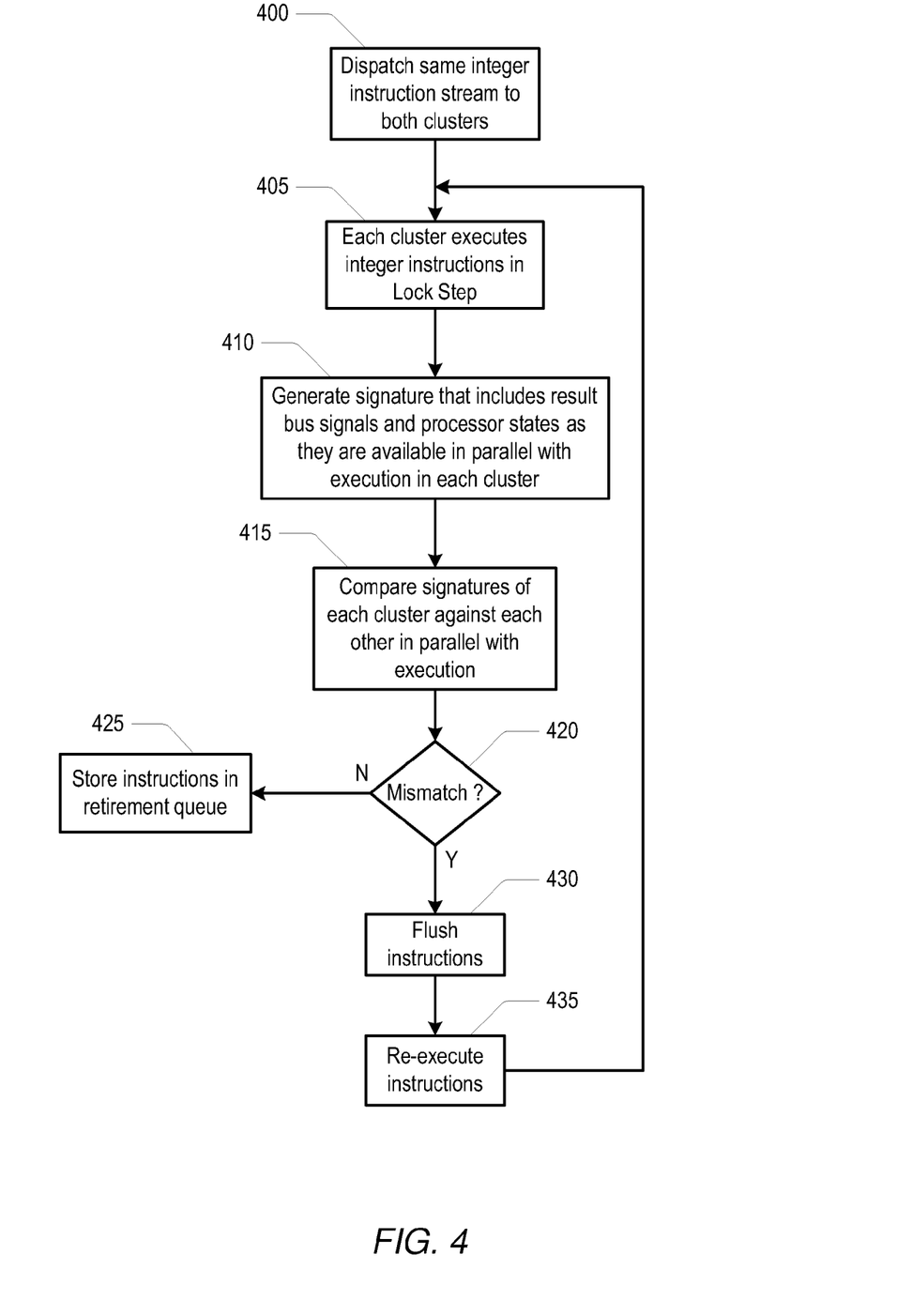
FIG. 4 is a flow diagram describing the operation of another embodiment of the processor of FIG. 1 and FIG. 2.

As described above, to reduce the number of wires necessary to convey the results for comparison, a signature or hash of the result signals may be used. As such, the signature generator blocks 157 of FIG. 1 and signature generator 265 of FIG. 2 may be used to perform that function. In addition, in contrast to many conventional systems, the signature generation and subsequent comparisons shown in FIG. 1 through FIG. 4 may be performed in parallel with the processing, (i.e., as the results become available). Thus, the signature generation and comparisons are removed from the processing critical path. FIG. 4 is a flow diagram describing the operation of another embodiment of processor core 100 of FIG. 1 and FIG. 2. More particularly, the operation depicted in FIG. 4 is similar to the operation depicted in FIG. 3. However, the operation shown I FIG. 4 includes additional steps. Accordingly, for clarity only the operation that differs from that shown in FIG. 3 will be described.

Referring collectively to FIG. 1 through FIG. 4, and beginning in block 410 of FIG. 4, processor core 100 is operating in reliable execution mode, and has fetched and dispatched the same integer instructions to each cluster 150. Each cluster executes the instructions in lock-step. At one or more selected locations along the result bus of each cluster, the result bus signals are intercepted. As the results become available, signature generators (e.g., 157a, 157b, 265) generate a signature or hash of the results and the processor state, as described above (block 415). The generated signature is conveyed to the other cluster, and each cluster compares its signature against the signature received from the other cluster (block 420). The signature generation and subsequent comparisons occur in parallel with the instruction execution. Depending on the outcome of the comparison, the results may be stored in the retirement queue 290, or the instructions may be flushed and re-executed (blocks 425-440).

Referring to block 455, as described above in the description of block 355 of FIG. 3, the DEC 140 may dispatch a floating-point instruction thread to the FPU 160. Signature generator 157c generates a signature from the results of the execution of the floating-point instruction thread (block 460). In one embodiment, the results are held in the FP compare unit 163. As described above, the DEC 140 dispatches the same floating-point instruction thread that was just executed to the FPU 160 (block 465). Signature generator 157c generates a signature from the results of the second execution of the floating-point instruction thread (block 470). FP compare unit 163 compares the current results of the thread execution against the held results from the previous thread execution (block 475). Depending on the outcome of the comparison, the results may be stored in the retirement queue 290, or the instructions may be flushed and re-executed (blocks 480-495).

Turning to FIG. 5, a processor 500 includes four instances of core 100a-d, each of which may be configured as described above. In the illustrated embodiment, each of cores 100 may couple to an L3 cache 520 and a memory controller/peripheral interface unit (MCU) 530 via a system interface unit (SIU) 510. In the illustrated embodiment, the reliable execution mode select pin may be coupled to the SIU 510. However, it is contemplated that in other embodiments, the pin may be connected to other blocks. In one embodiment, L3 cache 520 may be configured as a unified cache, implemented using any suitable organization, that operates as an intermediate cache between L2 caches 180 of cores 100 and relatively slow system memory 540.

MCU 530 may be configured to interface processor 500 directly with system memory 240. For example, MCU 530 may be configured to generate the signals necessary to support one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory that may be used to implement system memory 540. System memory 540 may be configured to store instructions and data that may be operated on by the various cores 100 of processor 500, and the contents of system memory 540 may be cached by various ones of the caches described above.

Additionally, MCU 530 may support other types of interfaces to processor 500. For example, MCU 530 may implement a dedicated graphics processor interface such as a version of the Accelerated Graphics/Advanced Graphics Port (AGP) interface, which may be used to interface processor 500 to a graphics-processing subsystem, which may include a separate graphics processor, graphics memory and/or other components. MCU 530 may also be configured to implement one or more types of peripheral interfaces, e.g., a version of the PCI-Express bus standard, through which processor 500 may interface with peripherals such as storage devices, graphics devices, networking devices, etc. In some embodiments, a secondary bus bridge (e.g., a "south bridge") external to processor 500 may be used to couple processor 500 to other peripheral devices via other types of buses or interconnects. It is noted that while memory controller and peripheral interface functions are shown integrated within processor 500 via MCU 530, in other embodiments these functions may be implemented externally to processor 500 via a conventional "north bridge" arrangement. For example, various functions of MCU 530 may be implemented via a separate chipset rather than being integrated within processor 500.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor core configured to operate in a reliable execution mode, the processor core comprising:
an instruction decode unit configured to dispatch a same integer instruction stream to a plurality of integer execution units, and to dispatch a same floating-point instruction thread to a floating point unit;
wherein the plurality of integer execution units is configured to operate in lock-step such that during each clock cycle, the plurality of integer execution units executes a same integer instruction;
wherein the floating point unit is configured to execute the same floating-point instruction thread twice;
signature generation logic coupled to each of the plurality of integer execution units and to the floating point unit, wherein the signature generation logic is configured to generate a respective signature from result signals conveyed on respective result buses in one or more pipeline stages within each respective one of the plurality of integer execution units in response to the result signals becoming available, wherein the signature generation unit is configured to generate the signatures concurrently with execution of the integer instructions;
wherein the signature generation logic is configured to generate a signature from result signals conveyed on result buses within the floating point unit, wherein the signature generation unit is configured to generate the signature concurrently with execution of the floating-point instructions; and
compare logic coupled to the signature generation logic and configured to detect a mismatch between signatures from each of the plurality of integer execution units;
wherein in response to the compare logic detecting any mismatch, the compare logic is configured to cause instructions causing the mismatch to be re-executed.

2. The processor core as recited in claim 1, wherein the compare logic is further configured to compare and detect a mismatch between signatures from each of the plurality of integer execution units prior to results from execution of the same integer instruction stream being placed in a retirement queue.

3. The processor core as recited in claim 1, wherein the compare logic is further configured to detect a mismatch between signatures of results of each execution of instructions in the same floating-point instruction thread.

4. The processor core as recited in claim 3, wherein the compare logic is further configured to compare and detect a mismatch between signatures of results of each execution of instructions in the same floating-point instruction thread prior to the floating-point unit transferring the execution results of the floating-point instruction thread to a retirement queue.

5. The processor core as recited in claim 1, wherein the signature generation logic is further configured to generate the respective signature using signals corresponding to processor state information within each respective one of the plurality of integer execution units.

6. A processor core configured to operate in a reliable execution mode, the processor core comprising:
an instruction decode unit configured to dispatch a same integer instruction stream to a plurality of integer execution units;
wherein the plurality of integer execution units is configured to operate in lock-step such that during each clock cycle, the plurality of integer execution units executes a same integer instruction;
signature generation logic coupled to each of the plurality of integer execution units, wherein the signature generation logic is configured to generate a respective signature from result signals conveyed on respective result buses in one or more pipeline stages within each respective one of the plurality of integer execution units in response to the result signals becoming available, wherein the signature generation unit is configured to generate the signatures concurrently with execution of the integer instructions; and
compare logic coupled to the signature generation logic and configured to detect a mismatch between signatures from each of the plurality of integer execution units;
wherein the compare logic is further configured to check results of branch mis-predictions within each of the plurality of integer execution units; and
wherein in response to the compare logic detecting any mismatch, the compare logic is configured to cause instructions causing the mismatch to be re-executed.

7. A processor core configured to operate in a reliable execution mode, the processor core comprising:
an instruction decode unit configured to dispatch a same integer instruction stream to a plurality of integer execution units;
wherein the plurality of integer execution units is configured to operate in lock-step such that during each clock cycle, the plurality of integer execution units executes a same integer instruction;
signature generation logic coupled to each of the plurality of integer execution units, wherein the signature generation logic is configured to generate a respective signature from result signals conveyed on respective result buses in one or more pipeline stages within each respective one of the plurality of integer execution units in response to the result signals becoming available, wherein the signature generation unit is configured to generate the signatures concurrently with execution of the integer instructions; and compare logic coupled to the signature generation logic and configured to detect a mismatch between signatures from each of the plurality of integer execution units;

wherein the compare logic is further configured to check for substantially simultaneous accesses to a level two cache by each of the plurality of integer execution units; and wherein in response to the compare logic detecting any mismatch, the compare logic is configured to cause instructions causing the mismatch to be re-executed.

8. A processor core configured to operate in a reliable execution mode, the processor core comprising:

an instruction decode unit configured to dispatch a same integer instruction stream to a plurality of integer execution units;

wherein the plurality of integer execution units is configured to operate in lock-step such that during each clock cycle, the plurality of integer execution units executes a same integer instruction;

signature generation logic coupled to each of the plurality of integer execution units, wherein the signature generation logic is configured to generate a respective signature from result signals conveyed on respective result buses in one or more pipeline stages within each respective one of the plurality of integer execution units in response to the result signals becoming available, wherein the signature generation unit is configured to generate the signatures concurrently with execution of the integer instructions;

wherein the signature generation logic is further configured to generate the respective signature from datapath input signals conveyed on respective datapath input buses in the one or more pipeline stages within each respective one of the plurality of integer execution units; and compare logic coupled to the signature generation logic and configured to detect a mismatch between signatures from each of the plurality of integer execution units;

wherein in response to the compare logic detecting any mismatch, the compare logic is configured to cause instructions causing the mismatch to be re-executed.

9. A method for protecting against logic errors in a processor core, the method comprising:

operating the processor core in a reliable execution mode;

dispatching a same integer instruction stream to a plurality of integer execution units and dispatching a same floating-point instruction thread to a floating point unit;

operating the plurality of integer execution units in lock-step such that during each clock cycle, the plurality of integer execution units executes a same integer instruction;

the floating point unit executing the same floating-point instruction thread twice;

signature generation logic generating a respective signature from result signals conveyed on respective result buses in one or more pipeline stages within each respective one of the plurality of integer execution units in response to the result signals becoming available by generating the signatures concurrently with execution of the integer instructions;

the signature generation logic generating a signature from result signals conveyed on result buses within the floating point unit, by generating the signature concurrently with execution of the floating-point instructions; and compare logic detecting a mismatch between signatures from each of the plurality of integer execution units;

wherein in response to the compare logic detecting any mismatch, the compare logic causing instructions that caused the mismatch to be re-executed.

10. The method as recited in claim 9, further comprising the compare logic comparing and detecting a mismatch between signatures from each of the plurality of integer execution units prior to results from execution of the same integer instruction stream being placed in a retirement queue.

11. The method as recited in claim 9, further comprising the compare logic detecting a mismatch between signatures of results of each execution of instructions in the same floating-point instruction thread.

12. The method as recited in claim 11, further comprising the compare logic comparing and detecting a mismatch between signatures of results of each execution of instructions in the same floating-point instruction thread prior to the floating-point unit transferring the execution results of the floating-point instruction thread to a retirement queue.

13. The method as recited in claim 9, further comprising generating the respective signature using signals corresponding to processor state information within each respective one of the plurality of integer execution units.

14. A method for protecting against logic errors in a processor core, the method comprising:

operating the processor core in a reliable execution mode;

dispatching a same integer instruction stream to a plurality of integer execution units and dispatching a same floating-point instruction thread to a floating point unit;

operating the plurality of integer execution units in lock-step such that during each clock cycle, the plurality of integer execution units executes a same integer instruction;

the floating point unit executing the same floating-point instruction thread twice;

signature generation logic generating a respective signature from result signals conveyed on respective result buses in one or more pipeline stages within each respective one of the plurality of integer execution units in response to the result signals becoming available by generating the signatures concurrently with execution of the integer instructions;

compare logic detecting a mismatch between signatures from each of the plurality of integer execution units;

the compare logic checking results of branch mis-predictions within each of the plurality of integer execution units and providing an indication in response to detecting a branch misprediction on one integer execution unit and not another integer execution unit; and wherein in response to the compare logic detecting any mismatch, the compare logic causing instructions that caused the mismatch to be re-executed.

15. A method for protecting against logic errors in a processor core, the method comprising:

operating the processor core in a reliable execution mode;

dispatching a same integer instruction stream to a plurality of integer execution units and dispatching a same floating-point instruction thread to a floating point unit;

operating the plurality of integer execution units in lock-step such that during each clock cycle, the plurality of integer execution units executes a same integer instruction;

the floating point unit executing the same floating-point instruction thread twice;

signature generation logic generating a respective signature from result signals conveyed on respective result buses in one or more pipeline stages within each respective one of the plurality of integer execution units in response to the result signals becoming available by generating the signatures concurrently with execution of the integer instructions;

compare logic detecting a mismatch between signatures from each of the plurality of integer execution units;

the compare logic checking for substantially simultaneous accesses to a level two cache by each of the plurality of integer execution units and providing an indication in response to non-substantially simultaneous accesses wherein in response to the compare logic detecting any mismatch, the compare logic causing instructions that caused the mismatch to be re-executed.

16. A method for protecting against logic errors in a processor core, the method comprising:

operating the processor core in a reliable execution mode;

dispatching a same integer instruction stream to a plurality of integer execution units and dispatching a same floating-point instruction thread to a floating point unit;

operating the plurality of integer execution units in lock-step such that during each clock cycle, the plurality of integer execution units executes a same integer instruction;

the floating point unit executing the same floating-point instruction thread twice;

signature generation logic generating a respective signature from result signals conveyed on respective result buses in one or more pipeline stages within each respective one of the plurality of integer execution units in response to the result signals becoming available by generating the signatures concurrently with execution of the integer instructions;

generating the respective signature from datapath input signals conveyed on respective datapath input buses in the one or more pipeline stages within each respective one of the plurality of integer execution units; and compare logic detecting a mismatch between signatures from each of the plurality of integer execution units;

wherein in response to the compare logic detecting any mismatch, the compare logic causing instructions that caused the mismatch to be re-executed.

17. A processor comprising:

a plurality of processor cores, each processor core comprising:

an instruction decode unit configured to dispatch a same integer instruction stream to a plurality of integer execution units, and to dispatch a same floating-point instruction thread to a floating point unit;

wherein the plurality of integer execution units is configured to operate in lock-step such that during each clock cycle, the plurality of integer execution units executes a same integer instruction;

wherein the floating point unit is configured to execute the same floating-point instruction thread twice;

signature generation logic coupled to each of the plurality of integer execution units and to the floating point unit, wherein the signature generation logic is configured to generate a respective signature from result signals conveyed on respective result buses in one or more pipeline stages within each respective one of the plurality of integer execution units in response to the result signals becoming available, wherein the signature generation unit is configured to generate the signatures concurrently with execution of the integer instructions;

wherein the signature generation logic is configured to generate a signature from result signals conveyed on result buses within the floating point unit, wherein the signature generation unit is configured to generate the signature concurrently with execution of the floating-point instructions; and compare logic coupled to the signature generation logic and configured to detect a mismatch between signatures from each of the plurality of integer execution units;

wherein in response to the compare logic detecting any mismatch, the compare logic is configured to cause instructions causing the mismatch to be re-executed.

18. The processor as recited in claim 17, wherein the compare logic is further configured to compare and detect a mismatch between signatures from each of the plurality of integer execution units prior to results from execution of the same integer instruction stream being placed in a retirement queue.

* * * * *